United States Patent
Lee et al.

(10) Patent No.: US 9,280,664 B2
(45) Date of Patent: Mar. 8, 2016

(54) APPARATUS AND METHOD FOR BLOCKING ACTIVITY OF MALWARE

(71) Applicant: ELECTRONICS AND TELECOMMUNICATIONS RESEARCH INSTITUTE, Daejeon (KR)

(72) Inventors: Cheol Ho Lee, Daejeon (KR); Sang Rok Lee, Daejeon (KR); In Sook Jang, Daejeon (KR); Jung Sun Kim, Daejeon (KR); Jung Min Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 19 days.

(21) Appl. No.: 14/472,047

(22) Filed: Aug. 28, 2014

(65) Prior Publication Data
US 2015/0242627 A1    Aug. 27, 2015

(30) Foreign Application Priority Data

Feb. 27, 2014    (KR) .................. 10-2014-0023408

(51) Int. Cl.
*G06F 21/44*    (2013.01)
*G06F 21/56*    (2013.01)

(52) U.S. Cl.
CPC ............ *G06F 21/562* (2013.01); *G06F 21/568* (2013.01)

(58) Field of Classification Search
CPC ........ H04L 63/101; H04L 63/10; G06F 21/44
See application file for complete search history.

(56) References Cited

U.S. PATENT DOCUMENTS

| 7,490,352 | B2 | 2/2009 | Kramer et al. |
| 8,984,629 | B2 * | 3/2015 | Kim ........................ G06F 21/50 713/164 |
| 2015/0286821 | A1 * | 10/2015 | Ghose ................... G06F 9/3877 713/187 |

FOREIGN PATENT DOCUMENTS

| EP | 0 510 244 A1 | 10/1992 |
| JP | 06-348486 A | 12/1994 |
| KR | 10-2001-0082488 A | 8/2001 |
| KR | 10-0617755 B1 | 8/2006 |
| KR | 10-2007-0119619 A | 12/2007 |
| KR | 10-2009-0080220 A | 7/2009 |

OTHER PUBLICATIONS

"Stuxnet and AhnLab TrusLine," Stuxnet White Paper, AhnLab,Inc., 2010.

* cited by examiner

*Primary Examiner* — Izunna Okeke
(74) *Attorney, Agent, or Firm* — LRK Patent Law Firm

(57) ABSTRACT

An apparatus and method for blocking the activity of malware are disclosed. The apparatus for blocking the activity of malware includes a storage unit, a posting unit, and a control unit. The storage unit stores an automatic execution permission list and a set security level. The posting unit posts a predetermined control time immediately after user terminal booting and a predetermined control time immediately after user login. The control unit permits or blocks the execution of an execution attempt file for the predetermined control time immediately after the booting and the predetermined control time immediately after the user login based on the automatic execution permission list and the set security level.

14 Claims, 4 Drawing Sheets

APPARATUS AND METHOD FOR BLOCKING ACTIVITY OF MALWARE

CROSS-REFERENCE TO RELATED APPLICATION

This application claims the benefit of Korean Patent Application No. 10-2014-0023408, filed Feb. 27, 2014, which is hereby incorporated by reference in its entirety into this application.

BACKGROUND OF THE INVENTION

1. Technical Field

The present invention relates generally to an apparatus and method for blocking the activity of malware and, more particularly, to an apparatus and method for blocking the continuous activity of malware with which a user terminal (e.g., a personal computer (PC) or a smart phone) has been infected.

2. Description of the Related Art

Typical virus vaccines maintain information about files diagnosed as malware (i.e., a blacklist) in local storage or a cloud, checks whether or not a specific file is malware when a user accesses or executes the specific file, and blocks the execution of the specific file or deletes the specific file.

In the above scheme, the execution of a file that is the same as or similar to a file that had been previously diagnosed as malware by a virus vaccine can be blocked, but the execution of a new malicious file (i.e., a malicious file not registered on a blacklist) is permitted until the analysis of the new malicious file is completed.

For this reason, a heuristic detection scheme has been introduced. In this scheme, malware is not diagnosed based on a precise pattern, but the results of the static and dynamic analysis (or real-time monitoring) of a specific file are integrated and then the specific file is diagnosed as malware when a behavior pattern common in a specific malware type is detected in the specific file.

While virus vaccines detect and block malware using the blacklist scheme and the heuristic detection scheme, effective countermeasures against new malware are not sufficient.

As countermeasures against malware using the blacklist scheme exhibit their limitations as described above, security products capable of taking countermeasures against malware based on a white list have been recently released.

However, there is great difficulty maintaining a white list in the latest state because user terminals are used in various environments and also operating systems and applications are frequently updated. That is, in the white list scheme, a list of permitted programs is maintained, but the execution of a program not included in the list of permitted programs is blocked. Accordingly, when a list of programs executed in a normal user terminal environment is not accurately maintained, the execution of even a normal program is blocked. As a result, the white list scheme is problematic in that a user terminal may not normally operate.

For this reason, the white list scheme has been introduced and managed only to and within a specific environment (e.g., in an industry server and on a PC) in which an operating system and applications rarely change.

As described above, although the common white list scheme is based on a very powerful security concept related to the blocking of malware because the execution of files other than designated files is blocked, this scheme has difficulty maintaining a white list when there is a change attributable to the updating of an operating system and applications or when different programs are executed on different user terminals.

As a related technology, Korean Patent Application Publication No. 10-2001-0082488 entitled "Method for Preventing the Prohibited Program from Running in Multiple Computers within the Local Area Network System" discloses a technology for preventing a prohibited program from being installed and executed on a multi-computer system connected to a local network.

SUMMARY OF THE INVENTION

Accordingly, the present invention has been made keeping in mind the above problems occurring in the conventional art, and an object of the present invention is to provide an apparatus and method for blocking the activity of malware, which are capable of blocking the activity of malware, which continues when a user terminal is terminated and restarted, in booting and login stages.

In accordance with an aspect of the present invention, there is provided an apparatus for blocking the activity of malware, including a storage unit configured to store an automatic execution permission list and a set security level; a posting unit configured to post a predetermined control time immediately after user terminal booting and a predetermined control time immediately after user login; and a control unit configured to permit or block the execution of an execution attempt file for the predetermined control time immediately after the booting and the predetermined control time immediately after the user login based on the automatic execution permission list and the set security level.

The control unit may be further configured to hook a system call related to the execution attempt when the user terminal is booted up; determine whether or not a current state corresponds to an automatic execution control-valid time based on whether or not the predetermined control time immediately after the booting of the user terminal has elapsed and whether or not the predetermined control time immediately after the user login has elapsed; and if, as a result of the determination, it is determined that the current state corresponds to an automatic execution control-valid time, determine whether or not to permit the execution of the execution attempt file by comparing information about the execution attempt file obtained through the hooking with the automatic execution permission list and the set security level.

The control unit may be further configured to determine whether or not the execution attempt file is a file permitted in the booting and user login processes based on the automatic execution permission list; and block the execution of the execution attempt file if, as a result of the determination, it is determined that the execution attempt file is not a file permitted in the booting and user login processes.

The control unit may be further configured to block the execution of the execution attempt file that is not a permitted file when the set security level is a first level.

The control unit may be further configured to determine whether or not a valid certificate has been included in the execution attempt file; and block the execution of the execution attempt file if, as a result of the determination, it is determined that the valid certificate has not been included in the execution attempt file.

The control unit may be further configured to block the execution of the execution attempt file in which the valid certificate has not been included when the set security level is a second level.

The control unit may be further configured to determine whether or not the execution attempt file is a file permitted when previous booting was executed based on the automatic execution permission list; and block the execution of the execution attempt file if, as a result of the determination, it is determined that the execution attempt file is not a file permitted when the previous booting was executed.

The control unit may be further configured to determine whether or not the execution attempt file is a file permitted in the booting and user login processes based on the automatic execution permission list and the set security level; block the execution of the execution attempt file if, as a result of the determination, it is determined that the execution attempt file is not a permitted file and the set security level is a first level; determine whether or not a valid certificate has been included in the execution attempt file when the set security level is not the first level; block the execution of the execution attempt file if, as a result of the determination, it is determined that the valid certificate has not been included in the execution attempt file and when the set security level is a second level; determine whether or not the execution attempt file is a file permitted when previous booting is executed based on the automatic execution permission list when the set security level is not the second level; and block the execution of the execution attempt file if, as a result of the determination, it is determined that the execution attempt file is not a file permitted when the previous booting is executed.

Each of the predetermined control time immediately after the booting of the user terminal and the predetermined control time immediately after the user login may be 10 seconds.

In accordance with another aspect of the present invention, there is provided a method of blocking activity of malware, including starting, by a control unit, automatic execution control mode when a user terminal is booted up; and when the automatic execution control mode is started, selectively permitting and blocking, by the control unit, execution of an execution attempt file for a predetermined control time immediately after the booting of the user terminal and a predetermined control time immediately after user login based on an automatic execution permission list and a set security level.

Permitting or blocking the execution of the execution attempt file may include hooking a system call related to the execution attempt when the user terminal is booted up; determining whether or not a current state corresponds to an automatic execution control-valid time based on whether or not the predetermined control time immediately after the booting of the user terminal has elapsed and whether or not the predetermined control time immediately after the user login has elapsed; and if, as a result of the determination, it is determined that the current state corresponds to an automatic execution control-valid time, determining whether or not to permit the execution of the execution attempt file by comparing information about the execution attempt file obtained through the hooking with the automatic execution permission list and the set security level.

Determining whether or not to permit the execution of the execution attempt file may include determining whether or not the execution attempt file is a file permitted in the booting and user login processes based on the automatic execution permission list; and blocking the execution of the execution attempt file if, as a result of the determination, it is determined that the execution attempt file is not a file permitted in the booting and user login processes.

Blocking the execution of the execution attempt file may include blocking the execution of the execution attempt file that is not a permitted file when the set security level is a first level.

Determining whether or not to permit the execution of the execution attempt file may include determining whether or not a valid certificate has been included in the execution attempt file; and blocking the execution of the execution attempt file if, as a result of the determination, it is determined that the valid certificate has not been included in the execution attempt file.

Blocking the execution of the execution attempt file may include blocking the execution of the execution attempt file in which the valid certificate has not been included when the set security level is a second level.

Determining whether or not to permit the execution of the execution attempt file may include determining whether or not the execution attempt file is a file permitted when previous booting is executed based on the automatic execution permission list; and blocking the execution of the execution attempt file if, as a result of the determination, it is determined that the execution attempt file is not a file permitted when the previous booting is executed.

Determining whether or not to permit the execution of the execution attempt file may include determining whether or not the execution attempt file is a file permitted in the booting and user login processes based on the automatic execution permission list and the set security level; blocking the execution of the execution attempt file if, as a result of the determination, it is determined that the execution attempt file is not a permitted file and when the set security level is a first level; determining whether or not a valid certificate has been included in the execution attempt file when the set security level is not the first level; blocking the execution of the execution attempt file if, as a result of the determination, it is determined that the valid certificate has not been included in the execution attempt file and when the set security level is a second level; determining whether or not the execution attempt file is a file permitted when previous booting is executed based on the automatic execution permission list when the set security level is not the second level; and blocking the execution of the execution attempt file if, as a result of the determination, it is determined that the execution attempt file is not a file permitted when the previous booting is executed.

Each of the predetermined control time immediately after the booting of the user terminal and the predetermined control time immediately after the user login may be 10 seconds.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
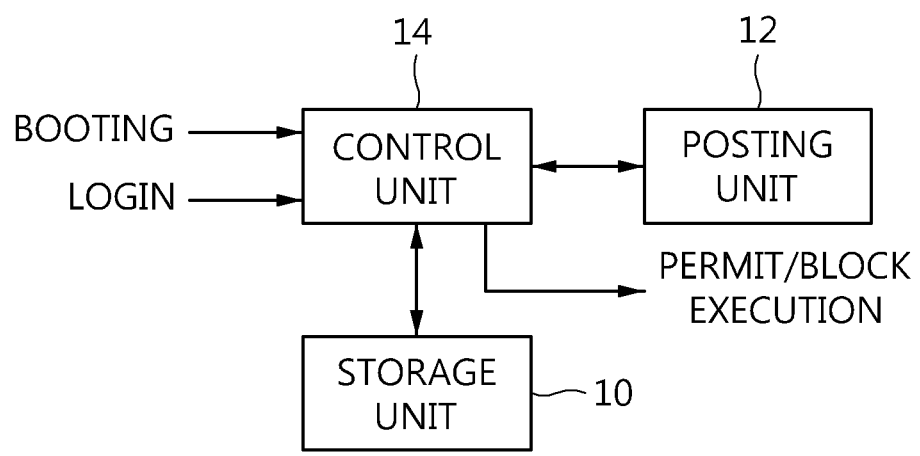
FIG. 1 is a diagram illustrating the configuration of an apparatus for blocking the activity of malware according to an embodiment of the present invention.

The present invention may be subjected to various modifications, and may have various embodiments. Specific embodiments are illustrated in diagrams and described in detail.

However, this is not intended to limit the present invention to the specific embodiments, but it should be appreciated that all modifications, equivalents and replacements included in the spirit and technical range of the present invention fall within the range of the present invention.

The terms used herein are used merely to illustrate specific embodiments, and are not intended to limit the present invention. Unless otherwise stated clearly, a singular expression includes a plural expression. In the specification and claims, it should be understood that the term "comprise," "include," "have" and their variants are intended merely to designate the presence of features, numbers, steps, operations, elements, parts or combinations thereof described in the specification, and should not be construed as excluding the presence or additional probability of one or more different features, numbers, steps, operations, elements, parts or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention are described in detail below with reference to the accompanying drawings. In the following description of the embodiments, the same reference numerals are assigned to the same elements throughout the drawings and also redundant descriptions of the same elements are omitted, in order to make the overall understanding easy.

FIG. 1 is a diagram illustrating the configuration of an apparatus for blocking the activity of malware according to an embodiment of the present invention.

The apparatus for blocking the activity of malware according to an embodiment of the present invention may include a storage unit 10, a posting unit 12, and a control unit 14. The apparatus according to this embodiment of the present invention may be installed on a user terminal, such as a PC, a smart phone, or a smart pad in the form of a module (e.g., a driver or a service).

The storage unit 10 stores an information list of files that are permitted to be executed (i.e., an automatic execution permission list) and information about a set security level, in connection with the control of the automatic execution of the files. In this case, the automatic execution permission list and the information about the security levels may be previously set and then stored.

The posting unit 12 posts predetermined control times immediately after booting and immediately after user login. In this case, the predetermined control time immediately after booting is referred to as a control time 1, and the predetermined control time immediately after user login is referred to as a control time 2. For example, each of the control time 1 and the control time 2 may be set to about 10 seconds. That is, the posting unit 12 may include a timer for posting the control times 1 and 2. The set control time 1 and the control time 2 described as examples may be controlled if necessary.

The control unit 14 starts automatic execution control mode when a user terminal is booted up, and permits or blocks a file now being executed for predetermined control times (e.g., the control time 1 and the control time 2) based on the automatic execution permission list and a corresponding security level immediately after booting and immediately after user login.

The control unit 14 may manage the automatic execution permission list in preparation for the case where a file intended by a user is blocked.

The storage unit 10 and the control unit 14 have been illustrated as being separate components in FIG. 1, but the storage unit 10 may be included in the control unit 14 if necessary.

Figure 2:
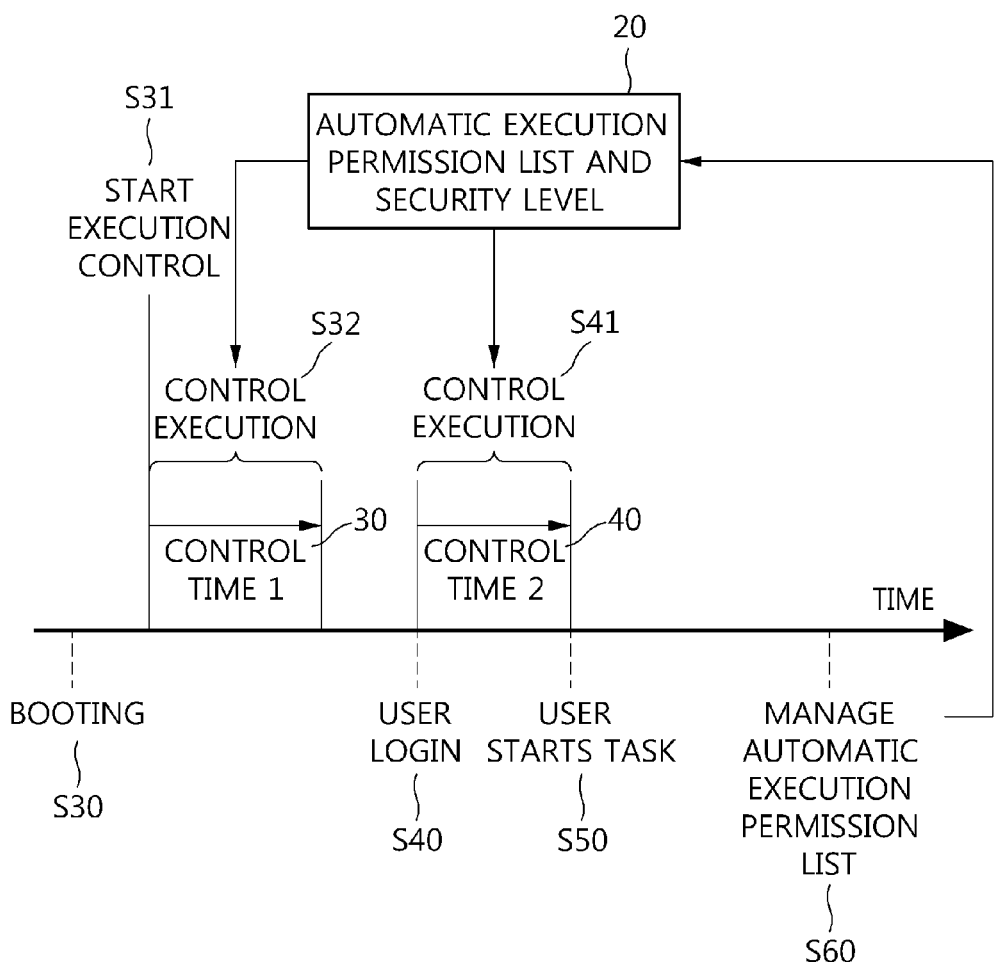
FIG. 2 is a diagram illustrating a process in which automatic execution is controlled and managed in time sequence during user terminal booting and user login.

FIG. 2 is a diagram illustrating a process in which automatic execution is controlled and managed in time sequence during user terminal booting and user login.

When the user terminal is booted up at step S30, the control unit 14 starts automatic execution control mode at step S31. Accordingly, the control unit 14 permits or blocks (S32, S41) a file that is being executed based on information 20 about an automatic execution permission list and a set security level for a predetermined control time 1 30 immediately after booting (see step S30) and a predetermined control time 2 40 immediately after user login (see step S40).

In other words, automatic execution control is maintained at step S32 for the control time 1 30 (e.g., about 10 seconds) immediately after the booting, and automatic execution control is maintained at step S41 for the control time 2 40 (e.g., about 10 seconds) immediately after the user login. In this case, the control time 1 30 and the control time 2 40 are posted on the posting unit 12.

In FIG. 2, step S50 corresponds to the step of starting not to be influenced by the automatic execution control. A file that is not included in the automatic execution permission list may be executed after step S50.

The control unit 14 may manage the automatic execution permission list in preparation for the case where a file intended by a user is blocked at step S60.

Figure 3:
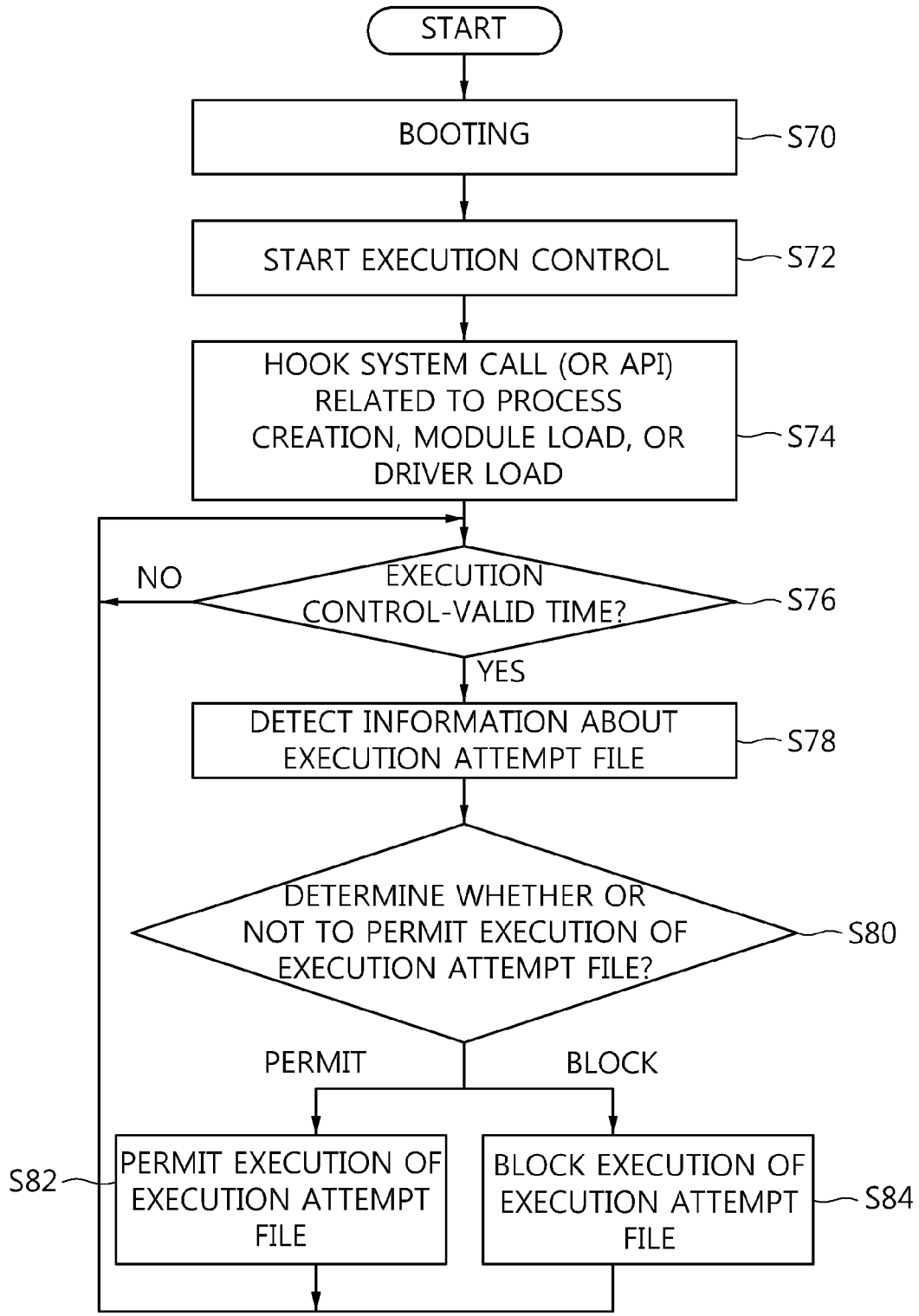
FIG. 3 is a flowchart illustrating a method of blocking the activity of malware according to an embodiment of the present invention.

FIG. 3 is a flowchart illustrating a method of blocking the activity of malware according to an embodiment of the present invention.

When a user terminal is booted up at step S70, the control unit 14 starts automatic execution control mode at step S72.

Accordingly, the control unit 14 hooks a system call (or an API) related to process creation, module loading or driver loading at step S74. That is, once automatic execution control mode is started, the control unit 14 detects an execution attempt (e.g., process creation, module loading, or driver loading), and hooks a system call (or an API) to block the attempt.

Thereafter, the control unit 14 continues to determine whether or not a current state corresponds to an automatic execution control-valid time based on whether or not user login is performed, whether or not the control time 1 30 has elapsed, and whether or not the control time 2 40 has elapsed at step S76. That is, the control unit 14 maintains automatic execution control for the control time 1 30 (e.g., about 10 seconds) immediately after booting, and maintains automatic execution control for the control time 2 40 (e.g., about 10 seconds) immediately after user login.

If, as a result of the determination, it is determined the current state corresponds to the automatic execution control-valid time ("YES" at step S76), the control unit 14 receives corresponding execution attempt system call (or API) information in the form of a hooked function, and detects information about an execution attempt file (e.g., the path of the file) at step S78.

Thereafter, the control unit 14 determines whether or not to permit the execution of the execution attempt file based on information 20 about the automatic execution permission list and the security level at step S80. That is, the control unit 14 checks whether or not the execution attempt file is included in the automatic execution permission list based on information about the detected execution attempt file.

If, as a result of the determination, it is determined that the execution of the execution attempt file is to be permitted ("permission" at step S80), the control unit 14 permits the execution of the execution attempt file at step S82. That is, the control unit 14 permits the execution attempt file to be executed if the execution attempt file is included in the automatic execution permission list.

In contrast, if, as a result of the determination, it is determine that the execution of the execution attempt file is not to be permitted ("block" at step S80), the control unit 14 blocks the execution of the execution attempt file at step S84. That is, the control unit 14 blocks the execution of the execution attempt file if the execution attempt file is not included in the automatic execution permission list.

Figure 4:
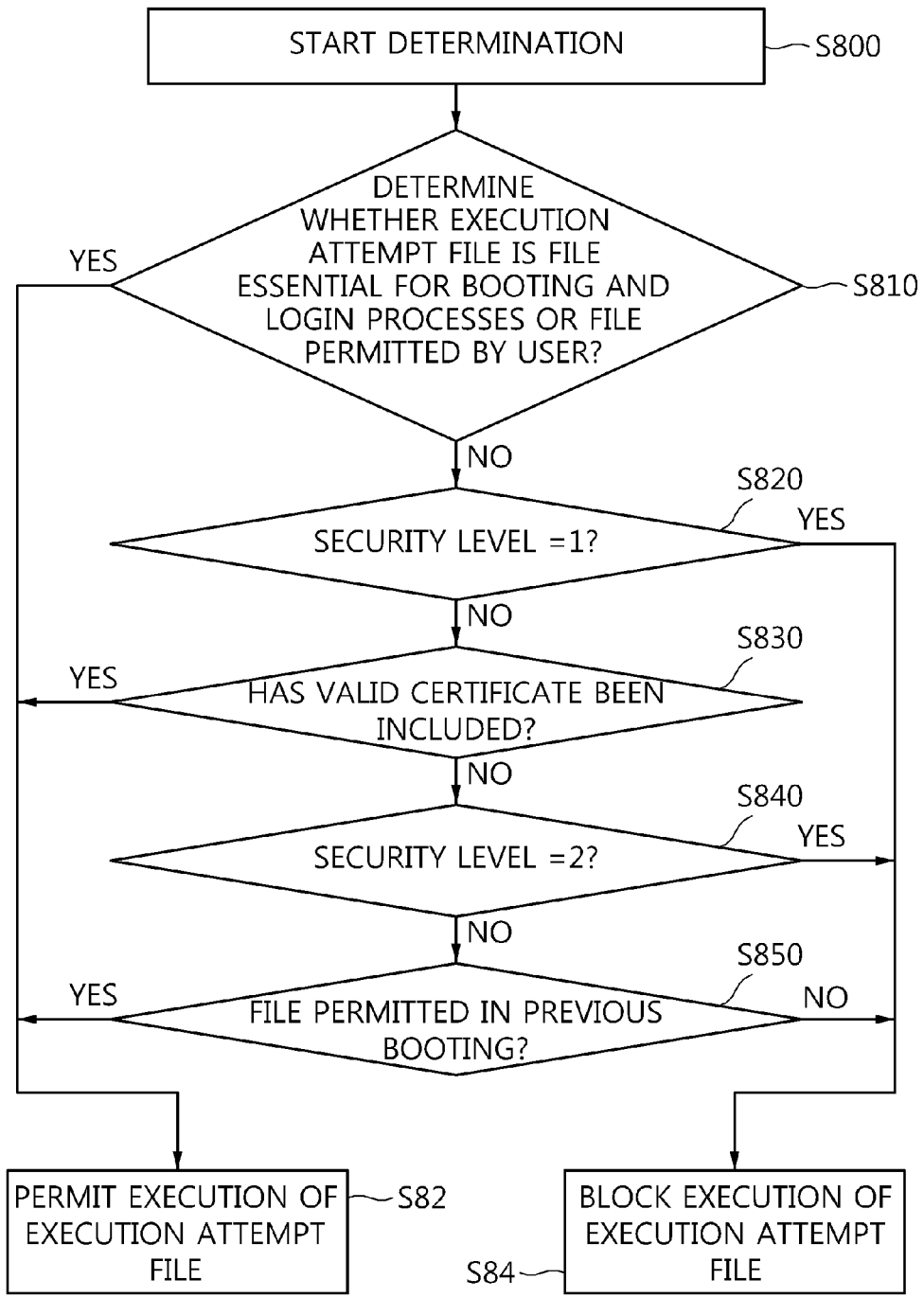
FIG. 4 is a flowchart illustrating a detailed procedure of determining whether or not to permit the execution of an execution attempt file at step S80 of FIG. 3.

FIG. 4 is a flowchart illustrating a detailed procedure of determining whether or not to permit the execution of an execution attempt file at step S80 of FIG. 3.

In an embodiment of the present invention, the security levels of the automatic execution control are classified into three levels: level 1, level 2, and level 3. A set security level is registered as the information 20 about the automatic execution permission list and the security level stored in the storage unit 10.

Once the control unit 14 has started to determine whether or not to permit the execution of an execution attempt file at step S800, the control unit 14 determines whether or not the execution attempt file is a file essential for booting and login processes or a file explicitly permitted by a user by referring to the information 20 about the automatic execution permission list and the security level at step S810.

If, as a result of the determination, it is determined that the execution attempt file is a file included in the automatic execution permission list, the control unit 14 permits the execution of the execution attempt file at step S82.

In contrast, if, as a result of the determination, it is determined that the execution attempt file is a file not included in the automatic execution permission list, the control unit 14 blocks the execution of the execution attempt file when the set security level is level 1 ("YES" at step S820) at step S84.

When the set security level is not level 1, the control unit 14 determines whether or not a valid certificate has been included in the execution attempt file at step S830.

If, as a result of the determination at step S830, it is determined that the valid certificate has been included in the execution attempt file, the control unit 14 permits the execution of the execution attempt file at step S82.

In contrast, if, as a result of the determination at step S830, it is determined that the valid certificate has not been included in the execution attempt file, the control unit 14 blocks the execution of the execution attempt file when the set security level is level 2 ("YES" at step S840) at step S84.

When the set security level is not level 2 (i.e., when the security level is set to level 3), the control unit 14 determines whether or not the execution attempt file is a file that was permitted when previous booting was executed at step S850.

If, as a result of the determination at step S850, it is determined that the execution attempt file is a file that was permitted when previous booting was executed in the state in which the security level has been set to level 3, the control unit 14 permits the execution of the execution attempt file at step S82.

In contrast, if, as a result of the determination at step S850, it is determined that the execution attempt file is not a file that was permitted when previous booting was executed in the state in which the security level has been set to level 3, the control unit 14 blocks the execution of the execution attempt file at step S84.

As described above, if the security level is set to level 3, the control unit 14 assumes that the system state of the apparatus according to an embodiment of the present invention at the time at which automatic execution files are initially installed is a state in which they are not infected with malware, and then performs a so-called learning process of recognizing a list of the automatic execution files in that state as an automatic execution permission list. That is, the control unit 14 may recognize an initial booting and user login situation, following the time at which the apparatus according to an embodiment of the present invention is initially run, as a learning situation, and may construct an automatic execution permission list. When subsequent booting and login are performed, the control unit 14 determines whether or not to permit automatic execution by performing steps S810 to S850 based on the constructed automatic execution permission list.

Although in FIG. 4, steps S810 to S850 have been illustrated as being sequentially performed in time sequence, steps S810 and S820, steps S830 and S840, and step S850 may be performed in parallel. That is, once whether or not to permit the execution of the execution attempt file starts to be determined, step S810 of determining whether or not the execution attempt file is an file essential for booting and login processes or a file explicitly permitted by a user, step S830 of determining whether or not a valid certificate has been included in the execution attempt file, and step S850 of determining whether or not the execution attempt file is a file that was permitted when previous booting was executed may be simultaneously performed, and the execution of the execution attempt file may be permitted or blocked through the comparison with the set security level at the steps.

As described above, in an embodiment of the present invention, security based on a white list is not applied to all the time during which a user terminal operates, but is applied to the control of the execution of files for specific times (e.g., about 10 seconds for each of the times) in the booting and login processes of the user terminal That is, a white list technique can be effectively managed because a white list of files that are influenced in booting and login processes has only to be maintained.

Although the installation and execution of malware cannot be prevented while a user terminal is being used after booting and login, the user terminal can avoid the control of an attacker because the automatic execution of the malware is blocked (i.e., fails) after the subsequent booting of the user terminal As a result, when security based on a white list is applied to a user terminal, which is frequently powered on or off, in booting and login processes, the continuous operation of malware can be blocked.

As described above, in accordance with at least an embodiment of the present invention, the continuous operation of malware installed on a user terminal can be blocked by blocking the execution of a non-permitted file when booting and login are performed.

In other words, although a user terminal has been infected with malware, the activity of the malware is stopped when the user terminal performs rebooting again, and thus an effect can be achieved as if the malware has been eliminated.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for blocking activity of malware, comprising:
 a processor and a memory for implementing:
 a storage unit configured to store an automatic execution permission list and a set security level;
 a posting unit configured to post a predetermined control time immediately after user terminal booting and a predetermined control time immediately after user login; and
 a control unit configured to:
 permit or block execution of an execution attempt file for the predetermined control time immediately after the booting and the predetermined control time immediately after the user login based on the automatic execution permission list and the set security level,
 hook a system call related to the execution attempt when the user terminal is booted up;
 determine whether or not a current state corresponds to an automatic execution control-valid time based on whether or not the predetermined control time immediately after the booting of the user terminal has elapsed and whether or not the predetermined control time immediately after the user login has elapsed;
 if, as a result of the determination, it is determined that the current state corresponds to an automatic execution control-valid time, determine whether or not to permit the execution of the execution attempt file by comparing information about the execution attempt file obtained through the hooking with the automatic execution permission list and the set security level,
 determine whether or not the execution attempt file is a file permitted in the booting and user login processes based on the automatic execution permission list and the set security level;
 block the execution of the execution attempt file if, as a result of the determination, it is determined that the execution attempt file is not a permitted file and the set security level is a first level,
 determine whether or not a valid certificate has been included in the execution attempt file when the set security level is not the first level;
 block the execution of the execution attempt file if, as a result of the determination, it is determined that the valid certificate has not been included in the execution attempt file and when the set security level is a second level;
 determine whether or not the execution attempt file is a file permitted when previous booting is executed based on the automatic execution permission list when the set security level is not the second level; and
 block the execution of the execution attempt file if, as a result of the determination, it is determined that the execution attempt file is not a file permitted when the previous booting is executed.

2. The apparatus of claim 1, wherein the control unit is further configured to:
 determine whether or not the execution attempt file is a file permitted in the booting and user login processes based on the automatic execution permission list; and
 block the execution of the execution attempt file if, as a result of the determination, it is determined that the execution attempt file is not a file permitted in the booting and user login processes.

3. The apparatus of claim 2, wherein the control unit further configured to block the execution of the execution attempt file that is not permitted file when the set security level is a first level.

4. The apparatus of claim 1, wherein the control unit is further configured to:
 determine whether or not a valid certificate has been included in the execution attempt file; and
 block the execution of the execution attempt file if, as a result of the determination, it is determined that the valid certificate has not been included in the execution attempt file.

5. The apparatus of claim 4, wherein the control unit is further configured to block the execution of the execution attempt file in which the valid certificate has not been included when the set security level is a second level.

6. The apparatus of claim 1, wherein the control unit is further configured to:
 determine whether or not the execution attempt file is a file permitted when previous booting was executed based on the automatic execution permission list; and
 block the execution of the execution attempt file if, as a result of the determination, it is determined that the execution attempt file is not a file permitted when the previous booting was executed.

7. The apparatus of claim 1, wherein each of the predetermined control time immediately after the booting of the user terminal and the predetermined control time immediately after the user login is 10 seconds.

8. A method of blocking activity of malware, comprising:
 starting, by a control unit, automatic execution control mode when a user terminal is booted up; and
 when the automatic execution control mode is started, selectively permitting and blocking, by the control unit, execution of an execution attempt file for a predetermined control time immediately after the booting of the user terminal and a predetermined control time immediately after user login based on an automatic execution permission list and a set security level,
 wherein permitting or blocking the execution of the execution attempt file comprises:
 hooking a system call related to the execution attempt when the user terminal is booted up;
 determining whether or not a current state corresponds to an automatic execution control-valid time based on whether or not the predetermined control time immediately after the booting of the user terminal has elapsed and whether or not the predetermined control time immediately after the user login has elapsed; and
 if, as a result of the determination, it is determined that the current state corresponds to an automatic execution control-valid time, determining whether or not to permit the execution of the execution attempt file by comparing information about the execution attempt file obtained through the hooking with the automatic execution permission list and the set security level, and
 wherein determining whether or not to permit the execution of the execution attempt file comprises:
 determining whether or not the execution attempt file is a file permitted in the booting and user login processes based on the automatic execution permission list and the set security level;
 blocking the execution of the execution attempt file if, as a result of the determination, it is determined that the execution attempt file is not a permitted file and when the set security level is a first level;
 determining whether or not a valid certificate has been included in the execution attempt file when the set security level is not the first level;
 blocking the execution of the execution attempt file if, as a result of the determination, it is determined that the valid certificate has not been included in the execution attempt file and when the set security level is a second level;

determining whether or not the execution attempt file is a file permitted when previous booting is executed based on the automatic execution permission list when the set security level is not the second level; and blocking the execution of the execution attempt file if, as a result of the determination, it is determined that the execution attempt file is not a file permitted when the previous booting is executed.

9. The method of claim 8, wherein determining whether or not to permit the execution of the execution attempt file comprises:

determining whether or not the execution attempt file is a file permitted in the booting and user login processes based on the automatic execution permission list; and blocking the execution of the execution attempt file if, as a result of the determination, it is determined that the execution attempt file is not a file permitted in the booting and user login processes.

10. The method of claim 9, wherein blocking the execution of the execution attempt file comprises blocking the execution of the execution attempt file that is not the permitted file when the set security level is a first level.

11. The method of claim 8, wherein determining whether or not to permit the execution of the execution attempt file comprises:

determining whether or not a valid certificate has been included in the execution attempt file; and blocking the execution of the execution attempt file if, as a result of the determination, it is determined that the valid certificate has not been included in the execution attempt file.

12. The method of claim 11, wherein blocking the execution of the execution attempt file comprises blocking the execution of the execution attempt file in which the valid certificate has not been included when the set security level is a second level.

13. The method of claim 8, wherein determining whether or not to permit the execution of the execution attempt file comprises:

determining whether or not the execution attempt file is a file permitted when previous booting is executed based on the automatic execution permission list; and blocking the execution of the execution attempt file if, as a result of the determination, it is determined that the execution attempt file is not a file permitted when the previous booting is executed.

14. The method of claim 8, wherein each of the predetermined control time immediately after the booting of the user terminal and the predetermined control time immediately after the user login is 10 seconds.

* * * * *